US011827860B2

(12) United States Patent
Ribeiro De Lima et al.

(10) Patent No.: US 11,827,860 B2
(45) Date of Patent: Nov. 28, 2023

(54) INTEGRATED PROCESS FOR THE PRE-TREATMENT OF BIOMASS AND PRODUCTION OF BIO-OIL

(71) Applicants: Suzano S.A., São Paulo (BR); Ensyn Renewables, Inc., Wilmington, DE (US)

(72) Inventors: Danilo Ribeiro De Lima, Jacareí (BR); Matheus Antunes Guimaraes, Aracruz (BR); Barry Freel, Ontario (CA); Geoffrey D. Hopkins, Ontario (CA)

(73) Assignee: Suzano S.A., São Paulo (BR)

( * ) Notice: Subject to any disclaimer, the term of this patent is extended or adjusted under 35 U.S.C. 154(b) by 0 days.

(21) Appl. No.: 16/304,458

(22) PCT Filed: May 26, 2017

(86) PCT No.: PCT/BR2017/050133
§ 371 (c)(1),
(2) Date: Nov. 26, 2018

(87) PCT Pub. No.: WO2017/201598
PCT Pub. Date: Nov. 30, 2017

(65) Prior Publication Data
US 2019/0144773 A1 May 16, 2019

Related U.S. Application Data

(60) Provisional application No. 62/490,966, filed on Apr. 27, 2017, provisional application No. 62/341,671, filed on May 26, 2016.

(51) Int. Cl.
*C10L 5/44* (2006.01)
*C10B 57/08* (2006.01)
(Continued)

(52) U.S. Cl.
CPC .............. *C10L 5/44* (2013.01); *C01G 1/04* (2013.01); *C10B 53/02* (2013.01); *C10B 57/08* (2013.01);
(Continued)

(58) Field of Classification Search
CPC .............. C10L 5/44; C10L 2290/545; C10L 2290/547; C11B 1/04; C10B 57/08
See application file for complete search history.

(56) References Cited

U.S. PATENT DOCUMENTS 4,159,944 A * 7/1979 Erickson ............... C02F 11/004
210/912
4,179,329 A * 12/1979 Svarz ....................... C02F 1/54
162/29
(Continued)

FOREIGN PATENT DOCUMENTS

WO WO 2009-003920 A1 1/2009
WO WO 2010/075429 A1 7/2010
WO WO 2012/089744 A1 7/2012

OTHER PUBLICATIONS

Stylianos D.Stefanidis, Eleni Heracleous, Despina Th.Patiaka, Konstantinos G.Kalogiannis, Chrysoula M.Michailof, Angelos A. Lappasa, Optimization of bio-oil yields by demineralization of low quality biomass, Biomass and Bioenergy vol. 83, Dec. 2015, pp. 105-115 (Year: 2015).*

(Continued)

*Primary Examiner* — Ellen M McAvoy
*Assistant Examiner* — Ming Cheung Po
(74) *Attorney, Agent, or Firm* — Alston & Bird LLP (57) ABSTRACT

The present invention aims to provide an integrated process for the pre-treatment of biomass and its use as a feedstock in a process for the production of biochemicals and biofuels, said integrated process preferably allowing the obtaining of (Continued)

quality bio-oil from a biomass such as wood, forest residues, and residues from the sugar-alcohol and energy cane industry.

15 Claims, 5 Drawing Sheets

(51) Int. Cl.
*C10B 53/02* (2006.01)
*C01G 1/04* (2006.01)
*C11B 1/04* (2006.01)

(52) U.S. Cl.
CPC .......... *C11B 1/04* (2013.01); *C10L 2200/0469* (2013.01); *C10L 2290/547* (2013.01); *Y02E 50/10* (2013.01); *Y02E 50/30* (2013.01); *Y02P 20/10* (2015.11)

(56) References Cited

U.S. PATENT DOCUMENTS

| | | | | |
|---|---|---|---|---|
| 8,471,080 | B2* | 6/2013 | Koukios | C10L 9/083 585/240 |
| 8,940,060 | B2 | 1/2015 | Baird et al. | |
| 2009/0084511 | A1 | 4/2009 | Lampinen et al. | |
| 2012/0144730 | A1 | 6/2012 | Stamires | |
| 2013/0263501 | A1 | 10/2013 | Monroe et al. | |
| 2014/0014592 | A1* | 1/2014 | Koukios | B01D 11/02 210/753 |

OTHER PUBLICATIONS

Stylianos D.Stefanidis, Eleni Heracleous, Despina Th.Patiaka, Konstantinos G.Kalogiannis, Chrysoula M.Michailof, Angelos A. Lappasa, Optimization of bio-oil yields by demineralization of low quality biomass, Biomass and Bioenergy, vol. 83, Dec. 2015, 105-115 (Year: 2015).*

International Search Report and Written Opinion for Application No. PCT/BR2017/050133 dated Aug. 22, 2017, 18 pages.

Carpenter, D., et al., *Biomass feedstocks for renewable fuel production: a review of the impacts of feedstock and pretreatment on the yield and product distribution of fast pyrolysis bio-oils and Vapors*, Green Chemistry, v. 16, (Nov. 17, 2013) 23 pages.

Garverick, L., (Editor) Corrosion in the Petrochemical Industry, The Materials Information Society (1994) 263 pages.

Liaw, S. B. et al., *Leaching characteristics of organic and inorganic matter from biomass by water: Differences between batch and semi-continuous operations*, Ind. Eng. Chem. Res. 52 (2013) 4280-4289.

Liu, X. et al., *Removal of inorganic constituents from pine barks and switchgrass*, Fuel Process. Technol. 92 (2011) 1273-1279.

Moreira, E. et al., *Effect of Acid Leaching of Eucalyptus Wood on Kraft Pulping and Pulp Bleachability*, Journal of Wood Chem. Technol. 28 (2008) 137-152.

Patwardhan, P. R., *Understanding the product distribution from biomass fast pyrolysis*, Theses and Dissertations, Iowa State University (2010) 162 pages.

Stefanidis, S. D. et al., *Optimization of bio-oil yields by demineralization of low quality biomass*, Biomass and Bioenergy 83 (2015) 105-115.

Trendewicz, A. et al., *Evaluating the Effect of Potassium on Cellulose Pyrolysis Reaction Kinetics*, Biomass and Bioenergy 74 (2015) 15-25.

Yu, C. et al., *Influence of leaching pretreatment on fuel properties of biomass*, Fuel Process, Technol. 128 (2014) 43-53.

* cited by examiner

INTEGRATED PROCESS FOR THE PRE-TREATMENT OF BIOMASS AND PRODUCTION OF BIO-OIL

FIELD OF THE INVENTION

This invention refers to an integrated process for the pre-treatment of biomass and its use as a higher quality feedstock in a process for the production of biochemicals and biofuels. More specifically, the process of this invention integrates an existing factory with the bio-oil production plant, which allows the use of effluent from the former in the pretreatment of the biomass to be used as a feedstock of the latter.

The integrated process described herein allows the use of pretreated biomass as a feedstock in chemical, biochemical and thermochemical processes, including production processes for food, animal feed, fine chemical industry products, biochemicals and biofuels.

Preferably, the integrated process described herein allows, but is not limited to, the use of pretreated biomass as a feedstock in the production of a high quality bio-oil product, and conversion yield. It is also economically viable because the treatment of the biomass is carried out with effluents from the existing process.

The process of this invention promotes the removal of metals from the biomass such as potassium, sodium, magnesium, calcium, iron, zinc, silica, sulfur and chlorine. The pretreated biomass has reduced levels of metals and other inorganic impurities, in addition to a variable granulometry and moisture depending on the final application of the material.

BACKGROUND OF THE INVENTION

There are different processes for converting biomass into value-added products in the industry of paper and cellulose, pharmaceuticals, food, chemicals, thermochemical processes (pyrolysis and gasification) and hydrolysis. The use of rapid pyrolysis is preferable for the conversion of ligno-cellulosic materials into a liquid biofuel. The liquid biofuel or bio-oil produced by rapid pyrolysis has less calorific power when compared with petrodiesel and an inferior quality, due to the high concentration of oxygen, water and inorganic impurities in the medium. Bio-oil is usually corrosive and must be processed or conditioned in a space formed of materials that are resistant to corrosion.

The quality of the bio-oil produced in the rapid pyrolysis process is affected by the quantity of water and minerals, especially metals, present in the lignocellulosic feedstock. A study by Patwardhan (2010) found that metal concentrations as low as 0.005 mmoles/g of cellulose are enough to affect the result of the pyrolysis. It was observed that alkali metals and alkaline earth metals have an inhibitory effect on the pyrolysis of the cellulose in the following decreasing order of importance:

Potassium>Sodium>Calcium>Magnesium.

In a study by Trendewicz et al (2015), it was indicated that the yield of bio-oil production fell from 87.9% to 54.0% in avicel cellulose after impregnation of the material with potassium. Cellulose impregnated with potassium also substantially increased the quantity of organic acids, aldehydes, furans and water in the produced bio-oil.

Several academic studies have demonstrated the advantage of removing inorganic impurities such as alkali metals and alkaline earth metals from the biomass prior to the pyrolysis process. The high-quality bio-oil, produced from the pretreated biomass, can be used in different industrial applications by meeting the technical specifications of quality. In addition, the bio-oil produced from the pretreated biomass has fewer organic acids and other components that cause metallic corrosion, which results in a more suitable liquid for processing, handling and storage. Furthermore, the bio-oil produced from the pretreated biomass contains less water, which is responsible for the higher calorific value of the final characterized product.

Methods proposed in the literature for the pretreatment of biomass include the use of acids and bases, in addition to the mechanical fractionation of the material. The use of acids and bases results in a high removal of inorganic impurities, although the demand for chemical inputs makes the application of the technology on a commercial scale unviable. The use of fractionators and mechanical classifiers of the biomass requires considerable investment in equipment and the removal of mineral impurities is not fully effective.

Another reported pretreatment method employs aqueous acid condensate from the pyrolysis process in the biomass leaching. This pretreatment requires the removal of the aqueous condensate in a group of secondary condensers installed in the pyrolysis system, resulting in a larger investment in the bio-oil producing unit.

Processes present in the state of the art for the removal of alkali metals from the lignocellulosic biomass use leaching with distilled or purified water as a solvent. In a study carried out by Moreira et al (2008) the effect of the acid leaching of wood chips with deionized water was studied. Liu & Bi (2011) studied the leaching of pine barks and grasses. Distilled water and diluted acid solutions were used in the process. Liaw & Wu (2013) studied the aqueous leaching of wood and grass in batch and semi-continuous reactors. The leaching used ultrapure water as a solvent. Yu & al (2014) studied the leaching of inorganic material from various types of biomass to reduce fouling and corrosion problems in combustion systems. Deionized distilled water was used for the biomass leaching. Stefanidis et al (2015) investigated the removal of inorganic impurities from forest biomass, agricultural residues and grasses in order to increase the yield of bio-oil in the rapid pyrolysis. Leaching with acidified distilled water was used.

Documents US 2012/0144730 A1 and U.S. Pat. No. 8,940,060 B2 describe methods for the leaching of the biomass using aqueous acid condensate from the pyrolysis as a solvent.

The biomass treatments according to the abovementioned documents are not integrated with the factory unit.

Document US 2009/0084511 A1 describes a method for processing wood chips, where this process contemplates a stage of removing the metals present in the chips through the use of a working solution containing a chelating agent to form complexes with the metal ions.

The treatment of the chips according to the aforementioned document does not use an effluent stream and is not integrated with the factory unit.

Although the attainment of a stage of treatment for removing metals from the biomass is known from the state of the art, it is imperative to develop an integrated process for the pretreatment of the biomass with a high impurity content and its use as a feedstock in a process for the bio-oil production, in order to guarantee, with the lowest energy and financial cost, the quality of the biomass for the production of biochemicals and biofuels, preferably bio-oil, which can then be used in several applications such as co-processing and direct combustion, among others.

This invention refers to an integrated process for the pretreatment of biomass with a high impurity content for the production of high quality feedstock using low cost solvents and/or effluents discarded in factory units.

SUMMARY OF THE INVENTION

This invention aims to provide an integrated process for pretreatment of biomass and its use as a feedstock in a process for the production of biochemicals and biofuels, the integrated process preferably allowing the obtaining of quality bio-oil from the biomass such as wood, forest residues and residues from the sugar-alcohol and energy cane industry.

A first embodiment of this invention refers to an integrated process for converting biomass with a high impurity content by pretreating the biomass and using it as a high quality feedstock in a process for the production of biochemicals and biofuels, preferably bio-oil.

A second embodiment of the invention refers to the pretreated biomass produced from the integrated process of this invention. Preferably, the pretreated biomass has a concentration of alkali metals and alkaline earth metals between 100 ppm and 2000 ppm, in which, more preferably, the potassium concentration ranges from 360 ppm to 800 ppm, the sodium concentration ranges from 200 ppm to 650 ppm, the calcium concentration ranges from 1000 ppm to 2000 ppm, and the magnesium concentration ranges from 400 to 500 ppm. More preferably, the pretreated forest biomass has preferably a potassium concentration of up to 135 ppm, even more preferably, up to 100 ppm, a sodium concentration of up to 245 ppm, more preferably, the sodium concentration is up to 210 ppm, the concentration of calcium is up to 1000 ppm, more preferably, the calcium concentration is up to 900 ppm, and the magnesium concentration is up to 250 ppm, more preferably, the magnesium concentration is up to 220 ppm, the iron concentration is up to 90 ppm, more preferably the iron concentration is up to 80 ppm and the chlorine concentration up to 100 ppm, more preferably, the chlorine concentration is up to 90 ppm, and even more preferably the chlorine concentration is up to 80 ppm.

A third embodiment of the invention refers to the use of the biomass obtained by the integrated process of this invention for the production of biochemicals and biofuels, preferably of bio-oil, with a higher yield and high quality for use in different applications in the industry.

DETAILED DESCRIPTION OF THE INVENTION

The expression biomass or plant biomass or lignocellulosic biomass refers to any type of plant, namely: wood, including bark and chips, leaves and roots; shrub and herbaceous biomass (grasses and weeds); sugarcane, including bagasse resulting from industrial processing and straw from the harvest; energy cane in its entirety, or just stems; straw and agricultural residues from the processing of maize (cob, leaves); cereal straw (rice, wheat, rye, inter alia). Furthermore, sawdust, cardboard and urban organic waste can be considered as lignocellulosic materials.

The plant biomasses are composed of three main fractions, which are cellulose, hemicellulose and lignin. Cellulose is a long chain polysaccharide, consisting exclusively of glucose units. Hemicellulose is also a polysaccharide, but it has a shorter chain than cellulose and consists mainly of sugar units of five carbon atoms, which bind the cellulose with the lignin. The third fiber fraction, lignin, is a complex polymer consisting of units of phenolic substances. Lignin acts as an organic barrier against the chemical or biological attack of the cellulose, imparting rigidity and impermeability, preserving the integrity of the fiber. Variations in the composition between the different species and even within the same species are due to environmental and genetic variability, soil type and fertilization.

The most abundant elements of the plant biomass in descending order are: C, O, H, N, Ca, K, Si, Mg, Al, S, Fe, P, Cl and Na, in which the quantity of metals may vary significantly depending on the species, variety and origin of the biomass. The pretreatment process can be applied to any type of biomass that can be used as a feedstock in any transformation process. Preferably, for the production of bio-oil from the rapid pyrolysis, the feedstocks of interest are:

a) wood and forest residues and b) grasses, agricultural and agroindustrial residues.

For the production of bio-oil in the rapid pyrolysis process, the feedstocks of interest are wood chips and bark and, not limited to these, sugarcane biomass and energy cane. Used in the production of cellulose pulp in pulp mills, wood chip produces a bio-oil of better quality and yield because it has a high purity and low ash and mineral content. On the other hand, wood bark is an abundant forest residue and is not used in the production of cellulose pulp. The bark has a high content of mineral impurities such as ash, sand and alkali metals and alkaline earth metals, such as potassium, sodium, calcium and magnesium in addition to a high chlorine concentration. For this reason, the use of wood bark as a feedstock in bio-oil production by rapid pyrolysis is limited.

Wood feedstocks include *araucaria* (for example, *A. cunninghamii, A. angustifolia, A. araucana*); long fiber cedar wood (for example, *Juniperus virginiana, Thuja plicata, Thuja ocddentalis, Chamaecyparis thyoides, Callitropsis nootkatensis*); cypress (for example, *Chamaecyparis, Cupressus Taxodium, Cupressus arizonica, Taxodium distichum, Chamaecyparis obtusa, Chamaecyparis lawsoniana, Cupressus sempervirens*); Rocky Mountain Douglas fir; European yew; fir (for example, *Abies balsamea, Abies alba, Abies procera, Abies amabilis*); hemlock (for example, *Tsuga canadensis, Tsuga mertensiana, Tsuga heterophylld*); kauri; kaya; larch (for example, *Larix decidua, Larix kaempferi, Larix laricina, Larix occidentalis*); pine tree (for example, *Pinus nigra*, jack pine, *Pinus contorta, Pinus radiata, Pinus ponderosa, Pinus macia, Pinus sylvestris, Pinus strobus, Pinus monticola, Pinus lambertiana, Pinus taeda, Pinus palustris, Pinus rigida, Pinus echinatd*); redwood; rimu; fir (for example, *Picea abies, Picea mariana, Picea rubens, Picea sitchensis, Picea glaucd*); sugi; acacia; azalea; *Synsepalum duloificum;* albizia (lebbek tree); alder (for example *Alnus glutinosa, Alnus rubra*); apple tree; Arbutus; ash wood (for example *F. nigra, F. quadrangulata, F. excelsior, F. pennsylvanica lanceolata, F. latifolia, F. profunda, F. americana*); aspen (for example *P. grandidentata, P. tremula, P. tremuloides*); Australian red cedar (Toona ciliata); ayan (*Distemonanthus benthamianus*); balsa tree (*Ochroma pyramidale*); linden (for example *T. americana, T. heterophylla*); beech (for example *F. sylvatica, F. grandifolia*); birch; (for example *Betula populifolia, B. nigra, B. papyrifera, B. lenta, B. alleghaniensis/B. lutea, B. pendula, B. pubescens*); sweet-chestnut; ebony; Mexican Rosewood; maple; boxwood; Brazilwood; Bubinga; horse-chestnut (for example *Aesculus hippocastanum, Aesculus glabra, Aesculus flava/Aesculus octandra*); white walnut; catalpa; cherry tree (for example, *P. Corridaus serotina, PCorridaus pennsylvanica, PCorridaus avium*); carap; red chestnut; *Ceratopelatum apetalum* (Coachwood); cocobolo; cork oak; cottonwood (for example *Populus balsamifera, Populus deltoides, Populus sargentii, Populus heterophylla*); magnolia; Cornelian cherry (for example *Cornus florida, Cornus nuttallii*); ebony (for example *Diospyros kurzii, Diospyros melanida, Diospyros crassiflora*); elm (for example *Ulmus americana, Ulmus procera, Ulmus thomasii, Ulmus rubra, Ulmus glabra*); eucalyptus; cogwood; passiflora; Tupelo (for example *Nyssa sylvatica, Eucalyptus globulus, Liquidambar styraciflua, Nyssa aquatica*); pecan (for example *Carya alba, Carya glabra, Carya ovata, Carya laciniosa*); hardwood tree; juca; ipe tree; Iroko; *Casuarina* (for example Bangkirai, *Carpinus caroliniana, Casuarina equisetifolia, Choricbangarpia subargentea, Copaifera* spp., *Eusideroxylon zwageri, Guajacum officinale, Guajacum sanctum, Hopea odorata*, Ipe, Krugiodendron ferreum, *Lyonothamnus lyonii* (L. *floribundus*), *Mesua ferrea, Olea* spp., *Olneya tesota, Ostrya virginiana, Parrotia persica, Tabebuia serratifolia*); rosewood; courbaril; sycamore; laurel; Terminalia; *Lignum vitae*; carob tree (for example *Robinia pseudacacia, Gleditsia triacanthos*); mahogany; maple (for example *Acer saccharum, Acer nigrum, Acer negundo, Acer rubrum, Acer saccharinum, Acer pseudoplatanus*); meranti; mpingo; Oak (for instance *Quercus macrocarpa, Quercus alba, Quercus stellata, Quercus bicolor, Quercus virginiana, Quercus michauxii, Quercus prinus, Quercus muhlenbergii, Quercus chrysolepis, Quercus lyrata, Quercus robur, Quercus petraea, Quercus rubra, Quercus velutina, Quercus laurifolia, Quercus falcata, Quercus nigra, Quercus phellos, Quercus texana*); obeche; Okoumé; Oregon myrtle; California bay laurel tree; pear tree; poplar (for example *P. balsamifera, P. nigra*, hybrid poplar (*Populus×canadensis*)); ramin; red-cedar; Brazilian rosewood tree; shala tree; sandal wood; *sassafras*; Indian satinwood; silky oak; silver wattle; snakeroot; azedeira; Spanish cedar; American sycamore; teak; walnut (for example *Juglans nigra, Juglans regia*); willow tree (for example *Salix nigra, Salix alba*); tulip tree (*Liriodendron tulipifera*); bamboo; palm tree; and combinations/hybrids thereof.

Experiments carried out with *eucalyptus* biomass demonstrate the inhibitory effect of the inorganic impurities present in the wood bark on the bio-oil quality and yield. Tests carried out on a bench scale with a mixture of 91% chip/9% bark of *eucalyptus* and 10% chip/90% bark of *eucalyptus* showed the harmful effect of the alkali metals present in the bark in the rapid pyrolysis process, as shown in Example 1. When the mixture with a high wood bark content was processed under the same operating conditions, the produced bio-oil had a lower mass and energy yield compared with a biomass with a higher quantity of chips. The water fraction in the bio-oil increased by more than 20% with the use of a lignocellulosic material with a high bark content, which is undesirable. The bio-oil production yield and quality are affected by the quantity of the minerals present in the processed biomass. In the pyrolysis process, the lignocellulosic biomass is converted into an intermediate reactive liquid before being evaporated into the condensable bio-oil fraction. In this stage, the minerals, more specifically alkali metals and alkaline earth metals, catalyze unwanted reactions, reducing the bio-oil fraction and favoring the formation of charcoal, gases and water. Not only do alkali metals and alkaline earth metals affect the quality and yield of the bio-oil production in the rapid pyrolysis, but they also result in the deactivation of the catalysts used in the catalytic petroleum cracking units, where the bio-oil is subsequently co-processed.

Depending on the type of fertilizer used and the location of the planting, the biomass may have atypical concentrations of minerals such as potassium, sodium, calcium, magnesium, aluminum, iron and chlorine. Planting near the oceanic coast results in a biomass with a high concentration of chlorine. Prolonged exposure to chlorine, more specifically chloride ions, can cause the wear of the passive layer of the steel, resulting in the alveolar corrosion of the equipment. According to Garverick, L. (1995), alveolar corrosion is accentuated by the high temperature used in the petrochemical processes and chlorine concentrations less than 100 ppm, preferably less than 50 ppm, are desirable in the industry. The pretreatment of the biomass allows the reduction of the bio-oil mineral impurities such as chlorine, for example, enabling its co-processing with the petroleum fractions in a catalytic cracking unit in the refineries.

As already mentioned, it is known that wood bark has a greater quantity of inorganic impurities such as potassium, sodium, calcium and magnesium than wood chip. When the mixture with a high bark content was processed under the same operating conditions, the produced bio-oil presented an inferior yield than with a higher quantity of wood chip. For the use of wood bark and other lignocellulosic materials with a high content of inorganic impurities in bio-oil production, a purification stage is necessary to remove the impurities.

Known methods of removing solid inorganic impurities from the biomass include: mechanical fractionation, blowing of the material with inert gas and solvent leaching. For the effective removal of the mineral impurities (including some of the metals bound to the organic matter in the crystalline and semi-crystalline form) from the biomass, it is necessary to promote the diffusion of the metallic substances from within the biomass to the external environment. Therefore, methods of removing the mainly non-organic inorganic impurities from the lignocellulosic material such as mechanical fractioning and blowing of the material with inert gas are not considered.

This invention refers to an integrated process for the pretreatment of biomass, in which the lignocellulosic material is cleaned to increase both the quality and yield of the produced biochemicals and biofuels. The biomass pretreated by the process of the invention is preferably used as a feedstock in a process for bio-oil production.

In the biomass cleaning stage, contacting the biomass with a liquid solvent allows the inorganic impurities to migrate from the region of the highest concentration to that of the lowest concentration (solvent), favoring the removal of the extrinsic and mainly intrinsic impurities from the biomass. For this reason, the leaching of the biomass with a liquid solvent is the preferred method for removing the mineral impurities, more specifically, the alkali metals from the biomass. The liquid solvent is preferably an aqueous solution.

The biomass demineralization proposed in this invention is carried out in the vicinity of the pyrolysis plant located in an area adjacent to the existing pulp mill or sugar cane factory, energy cane processing unit, or cellulose or second generation (2G) sugar production plant, or also an industrial processing unit that has equivalent liquid utilities and streams available. The integration takes place by location sharing, allowing the leaching unit to use the feedstock, co-products, utilities and infrastructure of the existing conventional unit, resulting in synergy benefits or gains in investments and operating costs, or by the retrofit of the existing unit, with the alteration of the conventional units for the accommodation of the pyrolysis plant, or also by remodeling, where the conversion of the existing conventional unit into a new biorefinery having a pyrolysis unit of the biomass and other second generation processes takes place. The technology integration will preferably occur by location sharing.

The cellulose production industry has intensive water consumption and, usually, the use of this resource in the manufacturing unit is rationalized. In the integration of the units by location sharing with the pulp mill, effluents such as condensation water, water from the bleaching stage, water from the drying machine, inter alia, can be used as solvents in the biomass leaching process in addition to process water.

Table 1 shows the solvents from the cellulose production plant that may be used in the integration proposed in this patent.

TABLE 1

| Solvent id# | Source | Temperature (° C.) | pH |
|---|---|---|---|
| Bleaching Effluent 1 | Bleaching | 50-60 | 4.0-5.0 |
| Bleaching Effluent 2 | Bleaching | 60-70 | <5.0 |
| Bleaching Effluent 3 | Bleaching | 50-70 | 5.0-11.0 |
| White water 1 | Drying | 40-60 | 5.0-6.0 |
| White water 2 | Drying | 50-60 | 2.0-5.0 |
| White water 3 | Drying | 50-60 | 5.0-8.0 |
| Condensate 1 | Evaporator | 25-30 | 6.0-8.0 |
| Hot water | Utilities | 70-80 | 6.0-8.0 |
| Process water | Utilities | 25-30 | 6.0-8.0 |

When using effluents from the cellulose bleaching and drying unit, as well as from black liquor evaporation, the waste stream from the pulp mill is valued, and the use of distilled or deionized water is not required, which would make the commercial application of leaching unviable.

In the integration of units by location sharing of the sugarcane factory, in addition to the process water, the phlegmatic effluents and plant condensate, inter alia, can be used as the solvents in the leaching process.

Table 2 shows the solvents from the existing sugar cane or energy cane processing plant that can be used in the proposed integration.

TABLE 2

| Effluent id# | Effluent Source | Temperature (° C.) | pH |
|---|---|---|---|
| Phlegm 1 | Distillation | 80-100 | 4.0-5.0 |
| Phlegm 2 | Distillation | 50-80 | 4.0-7.0 |
| Condensate 1 | Sugar factory | 80-100 | 4.0-6.0 |
| Condensate 2 | Sugar factory | 50-80 | 5.0-8.0 |
| Process water | Utilities | 25-30 | 6.0-8.0 |

In the integration of units by the location sharing of the cellulose or second generation sugar production factory, in addition to the process water, the following effluents can be used: pre-treatment water from washing of gases, cake filtration water and condensate from the sugar liquor evaporation, inter alia, as solvents in the leaching process.

Table 3 shows the solvents from the cellulose sugar production plant that may be used in the proposed integration.

TABLE 3

| Effluent id# | Effluent Source | Temperature (° C.) | pH |
|---|---|---|---|
| Water from washing of gases | Pretreatment | 40-60 | 2.0-5.0 |
| Water from washing of filters | Pretreatment | 30-60 | 2.0-4.0 |
| Condensate 1 | Distillation | 70-100 | 2.0-5.0 |
| Process water | Utilities | 25-30 | 6.0-8.0 |

The solvents mentioned in Tables 1, 2 and 3 exhibit different characteristics that may affect the quality of the produced bio-oil. Depending on the final application of the bio-oil, different solvents may be used in the pretreatment process of the biomass.

For example, in the direct combustion of the bio-oil, reasonable quantities of alkali metals and alkaline earth metals can be tolerated. However, in the catalytic processes such as bio-oil co-processing, the concentration of the inorganic impurities must be substantially reduced. Therefore, depending on the final application of the bio-oil, the demineralization of the biomass must be used.

This invention proposes a leaching method of easy integration into a cellulose or sugar-alcohol factory or even an existing second generation process, promoting the effective and viable demineralization of the lignocellulosic biomass. For this, effluents from the factory units are used in the process, with the biomass particle size compatible with the industrial applications, reduced residence time, high consistency and the maximum recovery of the organic solids.

The granulometry of the processed cellulose material is variable and depends on the sample collection point in the manufacturing unit that will be integrated. The particle size directly affects the biomass leaching rate (the lower the particle size, the larger the surface area of the material and the higher the leaching rate) and the processing and the transport of the solids. The forest biomass consists mainly of wood bark and chips having a particle size between 0.100 mm and 200 mm. The particle size of the forest biomass preferably ranges from 0.150 mm to 80 mm. More preferably, the particle size of the forest biomass ranges from 0.100 mm to 20 mm, and even more preferably from 0.250 mm to 10 mm. The biomass derived from sugar cane such as straw and bagasse, as well as energy cane, may have different particle sizes. Sugarcane biomass and energy cane fed into the pretreatment process generally have a particle size between 0.050 mm and 400 mm. The particle size of the sugarcane and energy cane biomass preferably ranges from 0.050 mm to 50 mm. More preferably, the particle size of sugarcane and energy cane biomass ranges between 0.100 mm and 15 mm and, more preferably, it ranges between 0.100 to 10 mm.

The biomass composition is also variable and depends on the location of the pretreatment unit installation and the availability of different types of lignocellulose materials at the locality. The material may be comprised of 100% wood bark or 100% wood chips or, preferably, a mixture of both, in varying concentrations. In another embodiment, the material may be comprised of 50% wood bark and 50% wood chips. The material preferably contains a quantity of wood bark of less than 50%.

In another embodiment, the material may be comprised of 5% wood bark and 95% wood chips, 10% wood bark and 90% wood chips, 15% wood bark and 85% wood chips, 20% wood bark and 80% wood chips, 25% wood bark and 75% wood chips, or, more preferably, 30% wood bark and 70% wood chips.

Grasses or agricultural residues from the sugarcane industry can also be used. The material is preferably comprised of straw and sugarcane bagasse, in addition to energy cane. Biomass from the forest industry can also be mixed with others from the sugar-alcohol and energy cane industry at variable concentrations.

The integrated process for the pretreatment of the biomass and its use as a feedstock in a process for the production of biochemicals and biofuels, preferably bio-oil, of this invention, comprises the following stages:
a) feeding at least one biomass or mixture of biomasses into a tank with a stirring system;
b) adding at least one solvent to the biomass of stage (a);
c) adjusting the consistency of the reaction medium;
d) stirring the solid/solvent mixture;
e) discharging the material obtained from stage (d) for the separation of the liquid and solid phases;
f) sending the liquid phase to the biomass fines recovery system;
g) feeding the solid material to a secondary dewatering system;
h) transporting the high quality pretreated biomass with the desired moisture content to the bioproduct production unit, preferably to the bio-oil production unit.

The biomass fed in stage (a) may be defined from the group consisting of: wood, including bark and chips, leaves and roots; shrub and herbaceous biomass, including grasses and weeds; sugarcane, including bagasse resulting from the processing in the industry and straw from the harvest; energy cane as a whole, or just stems; straw and agricultural residues from the processing of maize, including the cob and leaves; cereal straw such as rice, wheat, rye, inter alia, and also sawdust, cardboard and urban organic waste; or a mixture thereof.

Figure 1:
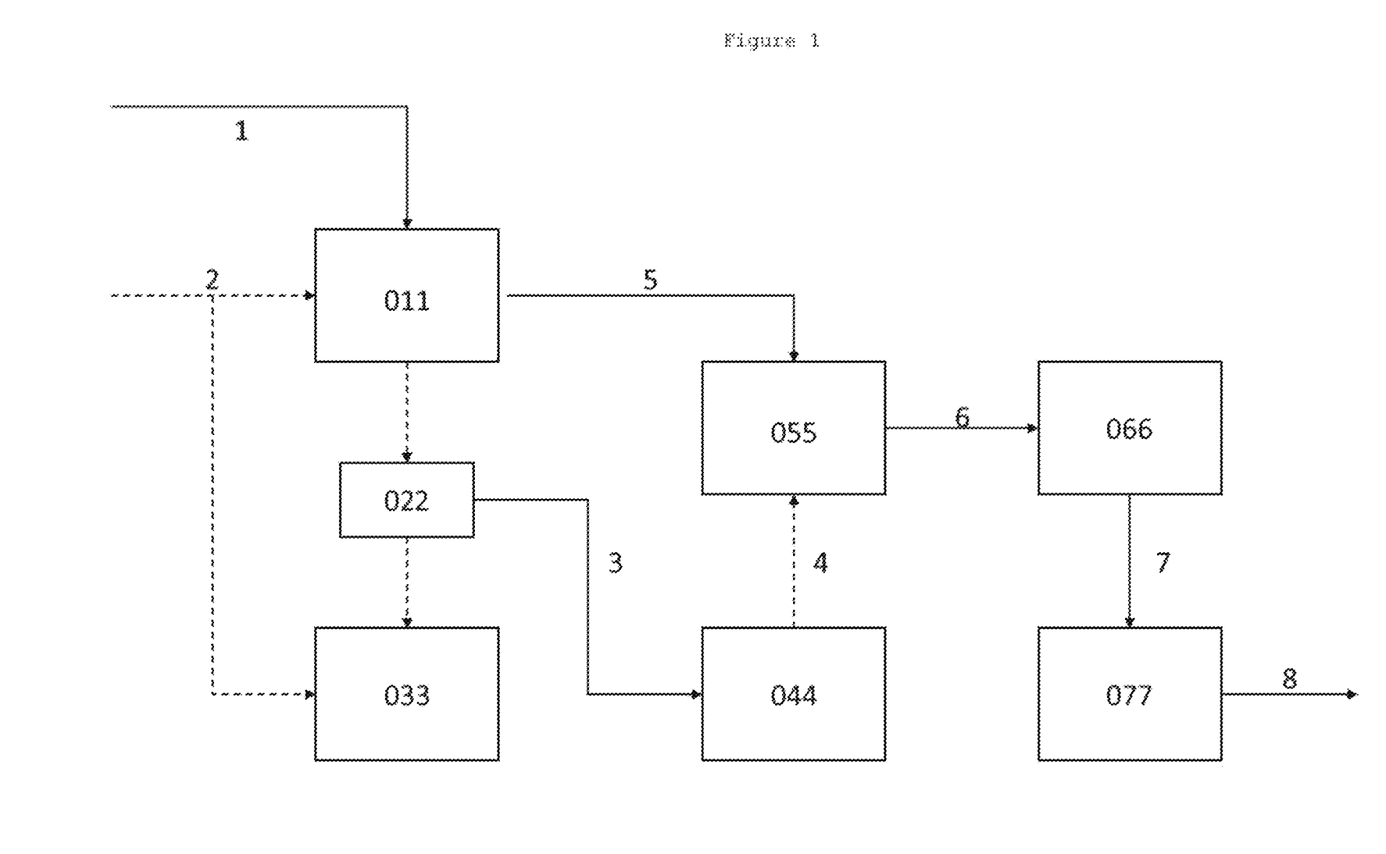
FIG. 1—describes the simplified route of the bio-oil production in the rapid pyrolysis with an integrated pretreatment system.

According to FIG. 1, part of the existing factory unit effluent is preferably used and attached as a solvent (2) in the pretreatment (011) of the biomass (1) prior to its disposal at the effluent treatment plant (033). The biomass recovered in the liquid effluent from the leaching (3), in a retriever (022), following the pretreatment stage, is used to generate heat (4) in the biomass boiler of the existing factory unit (044), in which part of that energy can be used in the pretreated biomass (5) drier (055). The dry pretreated biomass (6) is classified into equipment (066) and the dry material with suitable particle size (7) specifications is converted into bio-oil (8) in a rapid pyrolysis unit (077).

Figure 2:
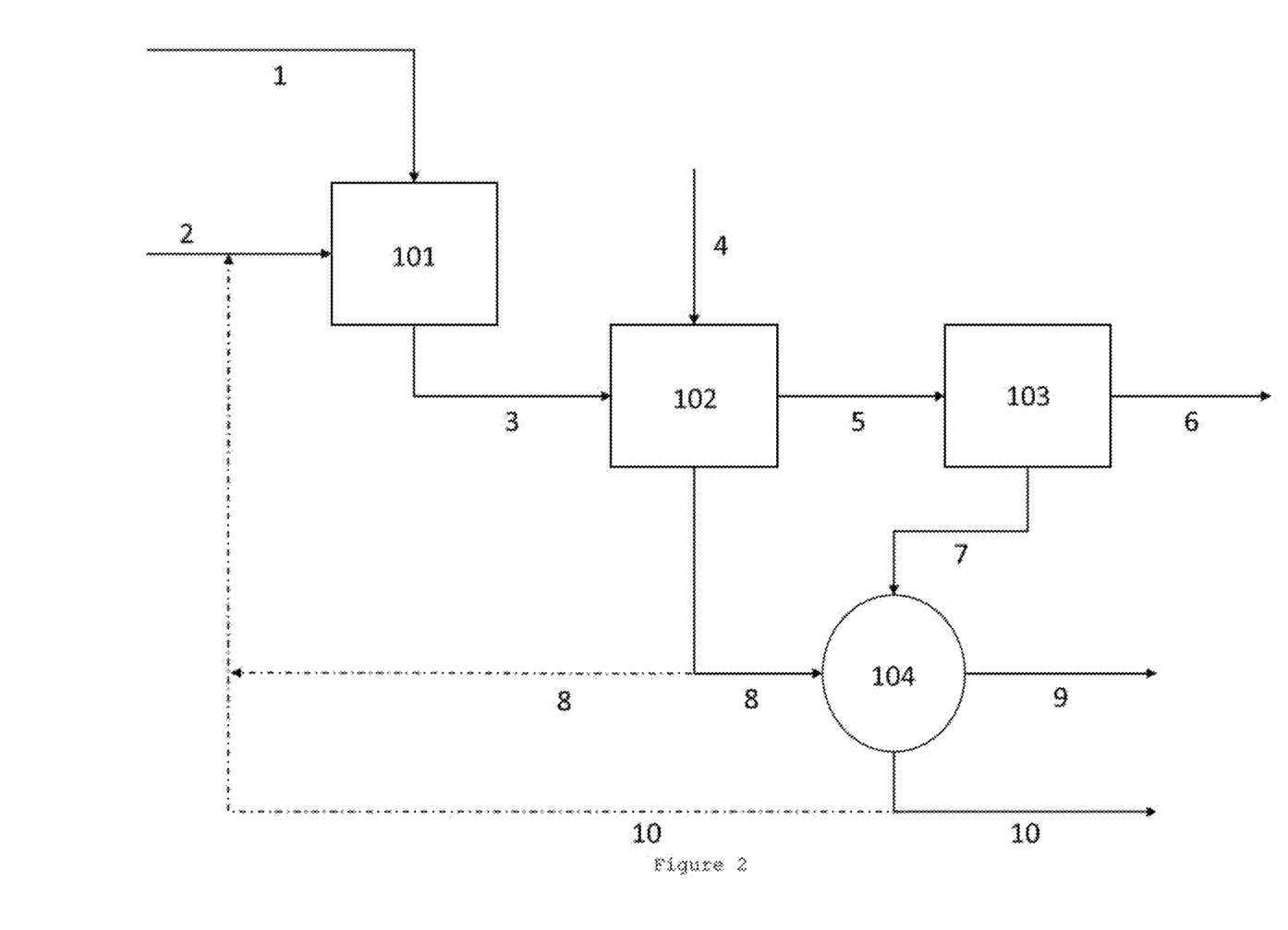
FIG. 2—illustrates a simplified flowchart showing one embodiment of the integrated process of this invention, using dewatering and post-washing of the biomass.

According to FIG. 2, in one embodiment of the integrated process, a tank with coupled stirring system or rotary drum (101) is fed with biomass (1) through a conveyor belt, feeder thread, bucket or pneumatic feeder. The solvent (2) is added to the system before or after the biomass addition. The solvent is added until the consistency of the medium is adjusted between 1% and 30% (solids content, mass basis). The consistency of the medium preferably ranges between 2% and 15%. More preferably, the consistency of the medium ranges between 5% and 15%. Even more preferably, the consistency of the medium is 5%.

Once the consistency of the medium is adjusted, the stirring of the solid mixture and the solvent is initiated. The rotary drum moves with a rotation speed between 5 and 300 rpm, preferably between 10 and 100 rpm, and between 5 and 50 rpm. More preferably, the rotary drum moves with a rotation speed between 10 and 50 rpm, even more preferably between 10 and 30 rpm. In a stirred tank system, the impeller has a rotation speed between 30 and 1000 rpm, and between 100 and 750 rpm, preferably between 100 and 600 rpm. More preferably, the impeller rotation ranges between 200 and 500 rpm. Rotation or stirring during leaching is adjusted taking into account the sample homogenization, medium viscosity and electricity consumption, ensuring the feasibility of the proposed system on a commercial scale.

Biomass leaching takes place in a tank with a coupled stirring system or a rotary drum (101) with a simple conformation in one stage, or in multiple stages, with tanks and drums in series or in parallel, and can take place in a batch or a continuous mode.

The temperature of the medium varies according to the effluent used (Table 1, Table 2 and Table 3). The temperature of the medium preferably varies between 25° C. and 100° C., more preferably between 25° C. and 80° C., and even more preferably the temperature of the medium is 50° C.

The pH of the medium varies according to the effluent used (Table 1, Table 2 and Table 3). The pH of the medium preferably varies between 2.0 and 11.0, more preferably between 3.0 and 8.0, and even more preferably the pH of the medium is 5.0.

The leaching time varies between 1 and 60 minutes. The leaching time preferably varies between 2 and 30 minutes. More preferably, the leaching time varies between 3 and 15 minutes, and even more preferably, the leaching time is 5 minutes. Short leaching times are used, ensuring the feasibility of the proposed system on a commercial scale.

Once the biomass is mixed with the solvent, the material (3) is discharged into a biomass dewatering screen (102). At this stage, the biomass inorganic impurities may be washed or post-extracted with a solvent (4) applied directly to the dewatering screen with the aid of jets or a spray. At the outlet of the dewaterer (102), the liquid phase (8) is recycled to the leaching system or sent to the biomass fines recovery system (104), which may consist of a centrifugal machine, filter or decanter. The recovered liquid phase (10) of the mixture is also recycled to the leaching system or sent to the existing and adjacent plant effluent treatment station. The liquid phase is preferably sent to the field for fertirrigation purposes. The biomass sludge recovered from the liquid phase (9) is dewatered in a dewatering machine or sent to the wood yard or bagasse stack of the existing or adjacent factory for drying and subsequent use in the boiler to generate heat and electricity. The separated biomass (5) is fed by gravity into a secondary dewatering system (103). The secondary dewatering system (103) may be comprised of a press filter, strainer filter, vacuum filter, membrane filter or a screw dewaterer. The recovered biomass fraction (6) has a final moisture content (solvent content, preferably aqueous solution) between 30% and 60%, and between 40% and 80%. The final moisture preferably varies between 40% and 70%. More preferably, the final moisture varies between 40% and 60%. Even more preferably, the final moisture is 60%.

The liquid fraction (7) obtained in the secondary dewatering system (103) is sent to the biomass fines recovery system (104) to take advantage of the fine solids still present in the medium.

Figure 3:
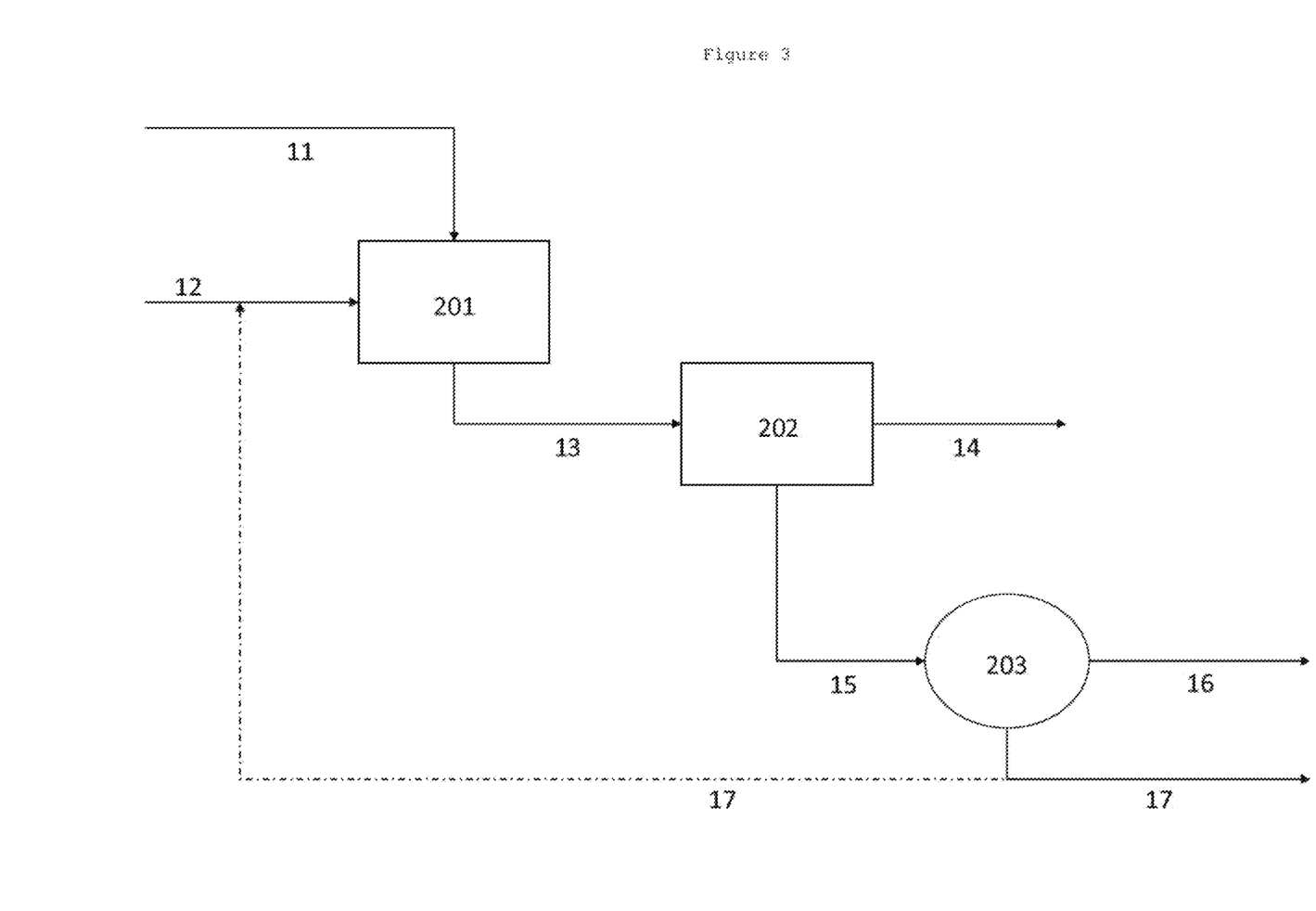
FIG. 3—shows a simplified flowchart with a second embodiment of the integrated process of this invention.

According to FIG. 3, in another embodiment of this invention, a tank with a coupled stirring system or a rotary drum (201) is fed with the biomass (11) through a conveyor belt, screw feeder, bucket or pneumatic feeder. The solvent (12) is added to the system before or after the biomass addition. The solvent is added until the consistency of the medium is adjusted between 1% and 30% (solids content, mass basis). The consistency of the medium preferably ranges between 2% and 15%, and between 2% and 10%. More preferably, the consistency of the medium ranges between 5% and 15%. Even more preferably, the consistency of the medium is 5%.

Once the consistency of the medium is adjusted, the stirring of the solid mixture and solvent is initiated. The rotary drum moves with a rotation speed between 5 and 300 rpm, preferably between 10 and 100 rpm, and between 5 and 50 rpm. More preferably, the rotary drum moves with a rotation speed between 10 and 50 rpm, even more preferably between 10 and 30 rpm. In a stirred tank system, the impeller has a rotation speed between 30 and 1000 rpm, and between 100 and 750 rpm, preferably between 100 and 600 rpm. More preferably, the impeller rotation ranges between 200 and 500 rpm. The rotation or stirring during the leaching is adjusted taking into account the sample homogenization, medium viscosity and electricity consumption, ensuring the feasibility of the proposed system on a commercial scale.

Biomass leaching takes place in a tank with a coupled stirring system or a rotary drum (201) with a simple conformation in one stage, or in multiple stages, with tanks and drums in series or in parallel, and can take place in a batch or a continuous mode.

The temperature of the medium varies according to the effluent used (Table 1, Table 2 and Table 3). The temperature of the medium preferably varies between 25° C. and 100° C., more preferably between 25° C. and 80° C., and even more preferably the temperature of the medium is 50° C.

The pH of the medium varies according to the effluent used (Table 1, Table 2 and Table 3). Preferably, the pH of the medium ranges between 2.0 and 11.0, more preferably between 3.0 and 8.0, even more preferably the pH of the medium is 5.0.

The leaching time varies between 1 and 60 minutes. The leaching time preferably varies between 2 and 30 minutes. More preferably, the leaching time varies between 3 and 15 minutes, and even more preferably, the leaching time is 5 minutes. Short leaching times are used, ensuring the feasibility of the proposed system on a commercial scale.

Once the biomass is mixed with the solvent, the material (13) is discharged into a dewatering system (202). The dewatering system may be comprised of a press filter, strainer filter, vacuum filter, membrane filter or a screw dewaterer. The liquid phase resulting from the dewatering (15) is sent to a biomass fines recovery system (203) which may be comprised of a centrifugal machine, filter or decanter. The recovered liquid phase (17) of the mixture is recycled to the leaching system or sent to the existing and adjacent plant effluent treatment station. The liquid phase is preferably sent to the field for fertirrigation purposes. The biomass sludge recovered from the liquid phase (16) is dewatered in a dewatering machine, and sent to the wood yard of the existing or adjacent factory for drying and subsequent use in the boiler to generate heat and electricity. The separated biomass (14) has a final moisture content (solvent content, preferably aqueous solution) between 30% and 60%, and between 40% and 80%. The final moisture preferably varies between 40% and 70%. More preferably, the final moisture varies between 40% and 60%. Even more preferably, the final moisture is 60%.

After drying the biomass, it can be minced, classified or used directly from the rapid pyrolysis process.

The bio-oil produced from the demineralized biomass has characteristics superior to those of the bio-oil produced from the non-demineralized biomass.

More detailed results are shown in the examples.

EXAMPLES

The following examples will better illustrate this invention. The described particular conditions and parameters represent preferred but not limiting embodiments of this invention.

Example 1

Effect of the Bark—and its Impurities—in Pyrolysis

Figure 4:
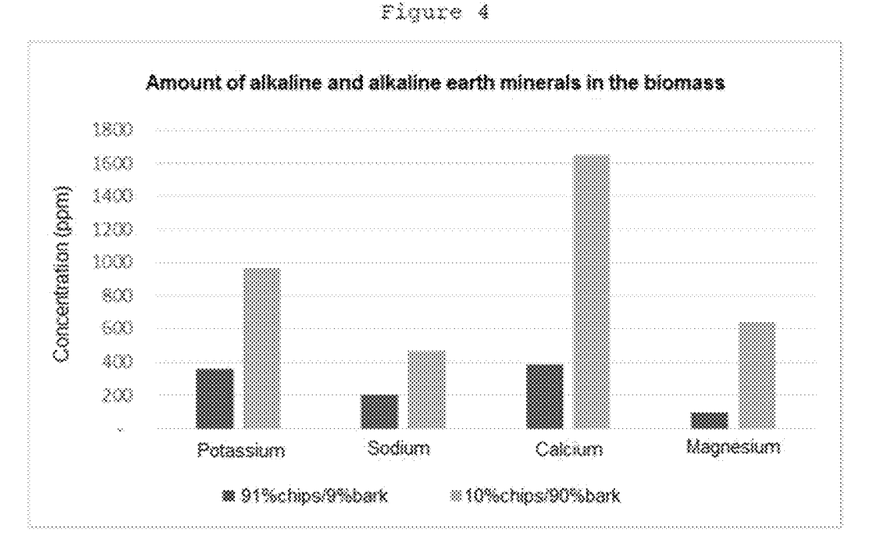
FIG. 4—shows the concentrations of alkali metals (sodium and potassium) and alkaline earth metals (calcium and magnesium) in a biomass with a high concentration of wood chips (91% w/w in mixture) and another with a high concentration of wood bark (90% w/w in mixture.
Figure 5:
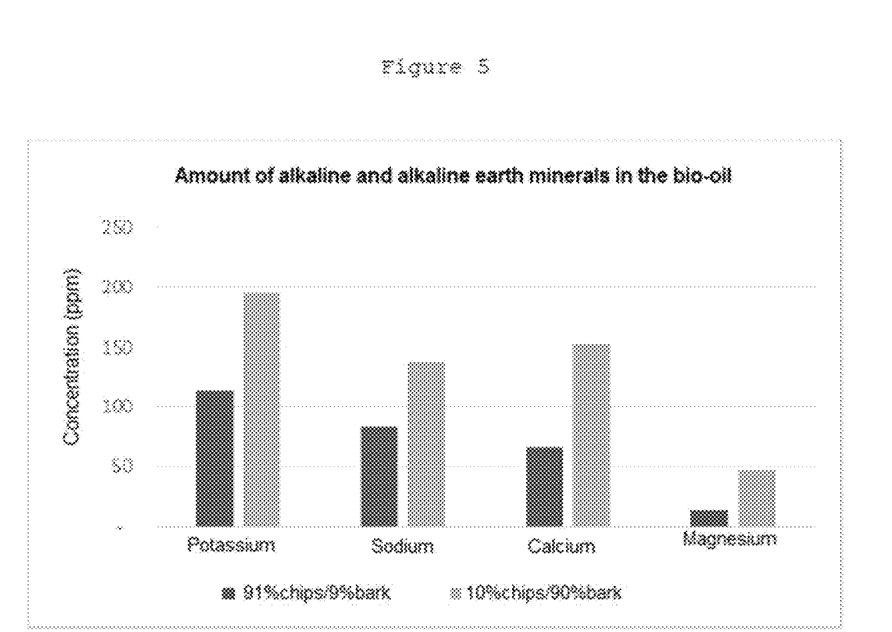
FIG. 5—shows the concentrations of alkali metals (sodium and potassium) and alkaline earth metals (calcium and magnesium) in the bio-oil resulting from a biomass with a high concentration of wood chips (91% w/w in mixture) and with a high concentration of wood bark (90% w/w in mixture).
Figure 6:
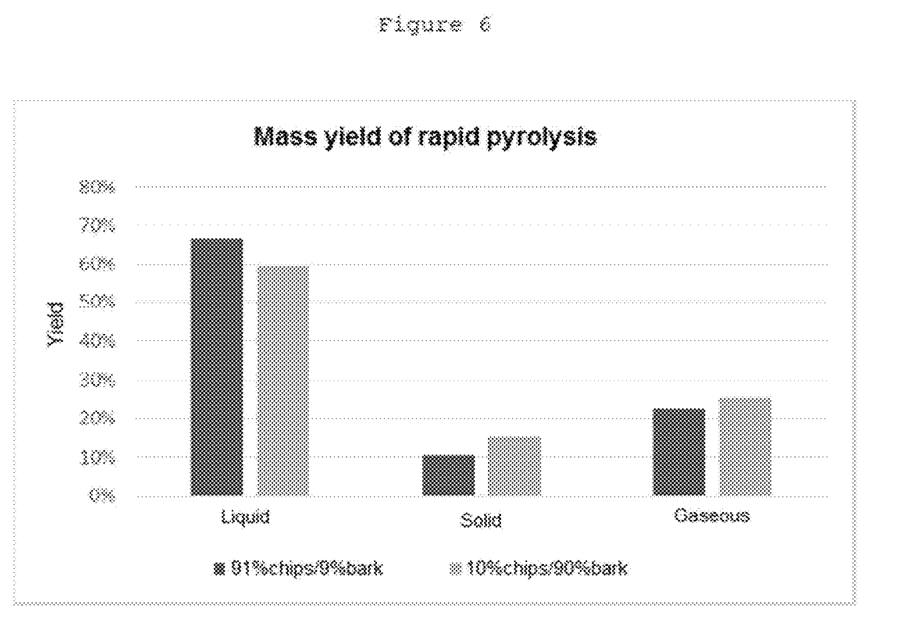
FIG. 6—shows the yield on a mass basis of the liquid (bio-oil), solid and gaseous products of the fast pyrolysis from a biomass with a high concentration of wood chips (91% w/w in mixture) and with a high concentration of wood bark (90% w/w in mixture).
Figure 7:
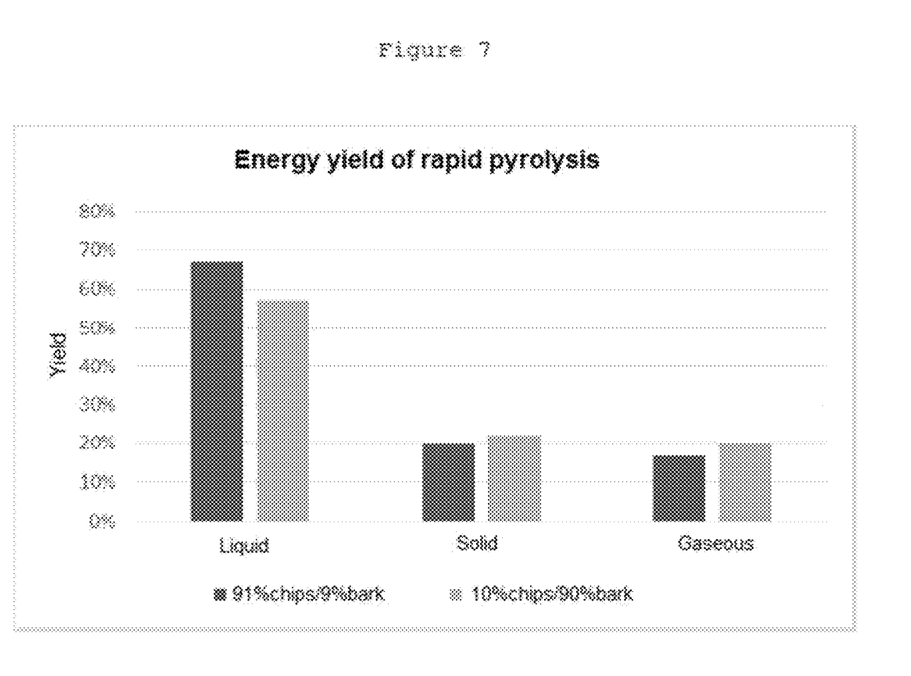
FIG. 7—shows the yield on an energy basis of liquid (bio-oil), solid and gaseous products of the fast pyrolysis from biomass with a high concentration of wood chips (91% w/w in mixture) and a high concentration of wood bark (90% w/w in mixture).

Experiments carried out with *eucalyptus* biomass demonstrate the inhibitory effect of the inorganic impurities on the bio-oil quality and yield. Samples with the composition a) 91% *eucalyptus* chip/9% bark and b) 10% *eucalyptus* chip/90% bark were subjected to rapid pyrolysis to analyze the effect of the alkali metals and alkaline earth metals on the quality and yield of the produced bio-oil (FIGS. 4 and 5). When the mixture with a high wood bark content was processed under the same operating conditions, the produced bio-oil had a lower mass and energy yield when compared with a biomass with a higher quantity of chips (FIGS. 6 and 7). The water fraction in the bio-oil increased by more than 20% with the use of a lignocellulosic material with a high bark content, which is undesirable. Accordingly, the results demonstrate the need to use a biomass with a low content of inorganic impurities in the rapid pyrolysis for the bio-oil production. Therefore, for the use of biomass with a high content of impurities, such as wood bark or even agricultural and agroindustrial residues, a pretreatment or the removal of the impurities from the used lignocellulosic material is required.

Example 2

A sample of 50% chip and 50% bark of *eucalyptus* was leached in a tank stirred with a water solvent at three pH levels: 7.5, 5 and 4. The normal distribution of the particles is asymmetrical, in which the largest fraction of the plant biomass has a grain size of less than or equal to 6 mm. The temperature of the used solvent ranged from 30 to 70° C. and no temperature control was performed during the demineralization process. The leaching consistency was 5% (solid to solvent ratio on a mass basis). The time period of the leaching process varied from 5 to 30 minutes and the stirring was maintained to supply a power to the system between 3 and 10 kW per m$^3$. After the demineralization, the biomass was dewatered and sent for analysis. Table 4 shows the metal concentrations before and after the forest biomass demineralization. The presented data shows an average reduction of potassium of 69%, of sodium of 66%, of magneium of 15%, and of calcium of 35% in the pretreated solid material. The pretreated biomass presents the following potential gains in relation to the non-pretreated biomass: an increase in the yield on a mass basis of the bio-oil between 5% and 20%, and a reduction of the water content of the bio-oil between 20% and 40%.

TABLE 4

| ID# | Potassium (ppm) | Sodium (ppm) | Magneium (ppm) | Calcium (ppm) |
| --- | --- | --- | --- | --- |
| Biomass "as is" | 1331.6 | 760.9 | 539.9 | 2595.1 |
| LIX1 | 436.0 | 218.0 | 458.6 | 1674.3 |
| LIX2 | 364.8 | 268.8 | 408.9 | 1512.4 |
| LIX3 | 438.4 | 297.5 | 497.0 | 2138.6 |
| LIX4 | 362.3 | 234.7 | 406.2 | 1412.1 |
| LIX5 | 446.1 | 300.6 | 515.6 | 1734.8 |
| LIX6 | 408.0 | 255.7 | 430.3 | 1458.6 |
| LIX7 | 398.2 | 214.3 | 405.0 | 1515.3 |
| LIX8 | 393.5 | 238.3 | 433.1 | 1441.7 |
| LIX9 | 419.7 | 246.9 | 484.5 | 1777.4 |
| LIX10 | 403.7 | 265.3 | 498.5 | 2141.6 |
| LIX11 | 425.7 | 283.8 | 484.3 | 1608.1 |

Example 3

A sample with a content of 70% chip and 30% bark of *eucalyptus* was leached in a tank stirred with a solvent from a cellulose production plant, more specifically a mixture of effluents from the wood log washing yard and from the evaporation of black liquor. The solvent has a temperature of 30° C. and a pH of 6. No temperature or pH control was required during the demineralization process. The normal distribution of the particles is asymmetrical, and the largest fraction of the plant biomass has a grain size of less than or equal to 6 mm. The leaching consistency was 5% (solid to solvent ratio on a mass basis). The time period of the leaching process was 5 minutes and the stirring was maintained in order to supply a power to the system between 3 and 10 kW per m$^3$. After the demineralization, the biomass was dewatered and sent for analysis. Table 5 shows the metal concentrations before and after the demineralization of the forest biomass. The presented data shows an average reduction of potassium of 65% and of chlorine of 85% in the pretreated solid material. The pretreated biomass presents the following potential gains in relation to the non-pretreated biomass: an increase in the yield on a mass basis of the bio-oil between 1% and 5%, and a reduction of chlorine in the bio-oil between 50% and 65%.

TABLE 5

| ID# | Potassium (ppm) | Chlorine (ppm) |
| --- | --- | --- |
| Untreated biomass | 1,164 | 1,307 |
| Treated biomass | 412 | 224 |

Example 4

A sample with 30% chip and 70% bark of *eucalyptus* was leached in a tank stirred with a water solvent at three pH levels: 7, 5.5 and 4. The biomass sample was not conditioned (chopped, classified or dried) and was taken as supplied by the existing pulp mill. The temperature of the used solvent varied from 30 to 70° C. and no temperature control was performed during the demineralization process. The leaching consistency was 5% (solid to solvent ratio on a mass basis). The time period of the leaching process varied from 5 to 30 minutes and the stirring was maintained in order to supply a power to the system between and 10 kW per m$^3$. After the demineralization, the lignocellulosic material was dewatered and sent for analysis. Table 6 shows the metal concentrations before and after the demineralization of the forest biomass. The presented data shows an average reduction in potassium and sodium of 57% and 46%, respectively. The removal of up to about 30% of the calcium and magnesium was achieved. The pretreated biomass presents the following potential gains in relation to the non-pretreated biomass: an increase in the yield on a mass basis of the bio-oil between 1% and 5%, and a reduction of the water content of the bio-oil between 5% and 20%.

TABLE 6

| ID# | Potassium (ppm) | Sodium (ppm) |
| --- | --- | --- |
| Biomass "as is" | 1598.0 | 799.0 |
| LIX21 | 792.8 | 574.1 |
| LIX22 | 816.4 | 478.1 |
| LIX23 | 791.7 | 442.1 |
| LIX24 | 479.6 | 409.9 |
| LIX25 | 912.6 | 648.7 |
| LIX26 | 640.0 | 420.2 |
| LIX27 | 810.6 | 520.9 |
| LIX28 | 682.6 | 401.5 |
| LIX29 | 589.4 | 304.4 |
| LIX30 | 495.2 | 257.6 |
| LIX31 | 554.9 | 256.1 |

Example 5

A sample with a content of 70% chip and 30% bark of *eucalyptus* was leached in a tank stirred with different solvents from a cellulose production plant, more specifically effluents from the cellulose drying machines. Solvent A has a temperature of 45° C. and a pH of 4.6. Solvent B has a temperature of 50° C. and a pH of 5.0. No temperature or pH control was required during the demineralization process. The normal distribution of the particles is asymmetrical, and the largest fraction of the plant biomass has a grain size of less than or equal to 6 mm. The leaching consistency was 5% (solid to solvent ratio on a mass basis). The time period of the leaching process was 5 minutes and the stirring was maintained in order to supply a power to the system between 3 and 10 kW per m$^3$. After the demineralization, the biomass was dewatered and sent for analysis. Table 7 shows the metal concentrations before and after the demineralization of the forest biomass. The presented data shows a reduction of potassium of 82% and of chlorine of 93% in the solid material pretreated with solvent A. For solvent B, the reduction of potassium was 77% and chlorine 93% in the pretreated solid material. The biomasses pretreated with solvent A and solvent B presented the following potential gains in relation to the non-pretreated biomasses: an increase in the yield on a mass basis of the bio-oil between 1% and 10%, and a reduction of the chlorine in the bio-oil between 75% and 95%.

TABLE 7

| ID# | Potassium (ppm) | Sodium (ppm) | Calcium (ppm) | Magnesium (ppm) | Iron (ppm) | Chlorine (ppm) | Total Ash (ppm) |
|---|---|---|---|---|---|---|---|
| Untreated biomass | 1,164 | 582 | 1,518 | 475 | 423 | 1,307 | 25,800 |
| Biomass pretreated solvent A | 209 | 397 | 1,040 | 257 | 190 | 93 | 12,000 |
| Biomass pretreated solvent B | 269 | 517 | 1,441 | 325 | 267 | 97 | 14,300 |

Example 6

Samples with a content of 30% chip and 70% bark of eucalyptus were leached in a tank stirred with different types of solvents. Process water (solvent S1) and two other acidic solvents (designated S2 and S3) were used with the objective of taking advantage of the aqueous streams from the cellulose mill. Solvent S1 has pH=7 and a temperature of 30° C. The other solvents have a pH between 7.0 and 4.0, and a temperature between 30° C. and 70° C. The biomass sample was not conditioned (chopped, classified or dried) and was taken as supplied by the existing cellulose mill. The leaching consistency was 5% (solid to solvent ratio on a mass basis). The leaching time was 5 minutes for solvents S1 and S2, and 18 minutes for solvent S3. Stirring was maintained in order to supply a power to the system between 3 and 10 kW per m$^3$. No temperature or pH control was carried out during the demineralization process. After the demineralization, the lignocellulosic material was dewatered and sent for analysis. Table 8 shows the metal concentrations before and after the demineralization of the forest biomass. The presented data shows a potassium reduction between 43% and 69%, respectively. The observed sodium reduction was between 19% and 68%, while the chlorine removal was between 59% and 80%. No significant calcium and magnesium reduction was observed in the studied conditions. The pretreated biomass presents the following potential gains in relation to the non-pretreated biomass: an increase in the yield on a mass basis of the bio-oil between 1% and 10%, and a reduction of the chlorine in the bio-oil between 55% and 80%.

TABLE 8

| ID# | Potassium (ppm) | Sodium (ppm) | Chlorine (ppm) |
|---|---|---|---|
| Untreated biomass | 1,598 | 799 | 799 |
| Water of process S1 | 913 | 649 | 743 |
| Acid Solvent S2 | 816 | 478 | 607 |
| Acid Solvent S3 | 495 | 258 | 358 |

Example 7

Chopped and milled energy cane was leached in a rotary drum at a pilot scale with a process water solvent (S1) and acidified water with a pH=4 (S2) with the objective to take advantage of the aqueous streams from the cellulose mill, from the production of sugar and alcohol and even the acid distillates from the production of cellulose ethanol. The temperature of the used solvent was less than 90° C. The leaching consistency was approximately 7% (solid to solvent ratio on a mass basis) and the process time less than 60 minutes. After the demineralization in a rotary drum, the energy cane was submitted to a post-extraction stage with process water at a temperature less than 65° C. Table 9 shows the metal concentrations before and after the demineralization of the sugarcane. The presented data shows a significant reduction in the quantity of potassium, sodium, magnesium and calcium in the pretreated solid material.

TABLE 9

| Element | Energy cane (ppm) | Energy cane, leaching with S1 (ppm) | Energy cane, leaching with S2 (ppm) |
|---|---|---|---|
| Potassium | 21,200 | 1,200 | 1,130 |
| Sodium | 1,360 | 490 | 570 |
| Magnesium | 17,000 | 11,300 | 9,560 |
| Calcium | 43,400 | 36,300 | 34,700 |

The energy cane without pretreatment and the leached energy cane were pyrolyzed. The results show that the yield of bio-oil production increased between 1 and 10%, the calorific value of the bio-oil increased between 15% and 30%, and the concentrations of mineral impurities such as potassium and chlorine reduced by 90% and 99% after the leaching of the energy cane.

As a result, it was observed that the biomass treated in accordance with the integrated process of this invention showed a reduction in the metal concentrations, with efficiency and viability, maintaining the quality and the yield in the bio-oil production in accordance with the rapid pyrolysis process, therefore ensuring its applicability in a process of direct combustion and co-processing, inter alia.

Example 8

A sample of chopped cane straw was leached in a tank stirred with different solvents from the sugar and alcohol production plant, more specifically the phlegmatic effluents from the alcohol distillation column (C) and the plant condensate from the sugar concentration and crystallization stage (D). Solvent C has a temperature of 50-60° C. and a pH between 4.0 and 5.0. Solvent C has a temperature of 50-60° C. and a pH between 5.0 and 6.0. No temperature or pH control was required during the demineralization process. The normal distribution of the particles is asymmetrical, and a high fraction of the plant biomass has a particle size less or equal to 50 mm, preferably less than 10 mm. The leaching consistency was higher than 4% (solid to solvent ratio on a mass basis). The time period of the leaching process was between 5 and 15 minutes and the stirring was maintained in order to supply a power to the system between 3 and 10 kW per m³. After the demineralization, the biomass was dewatered and considered for analysis. The pretreated biomass presents a significant reduction of ash, as well as the alkali metals and alkaline earth metals, and chlorine. The reduction of the content of the metals soluble in water (sodium and potassium) and chlorides is high. The biomass pretreated with solvent C and solvent D presents potential gains in relation to the non-pretreated sugarcane biomass such as an increase in the yield of the bio-oil production between 1% and 10%, a reduction of chlorine and iron in the bio-oil between 70% and 90%, and a reduction of water in the bio-oil between 5% and 20%.

REFERENCES

Patwardhan, P. R. Understanding the product distribution from biomass fast pyrolysis. 160 (2010).
Moreira, E. et al. Effect of Acid Leaching of *Eucalyptus* Wood on Kraft Pulping and Pulp Bleachability. J. Wood Chem. Technol. 28, 137-152 (2008).
Liu, X. & Bi, X. T. Removal of inorganic constituents from pine barks and switchgrass. Fuel Process. Technol. 92, 1273-1279 (2011).
Liaw, S. B. & Wu, H. Leaching characteristics of organic and inorganic matter from biomass by water: Differences between batch and semi-continuous operations. Ind. Eng. Chem. Res. 52, 4280-4289 (2013).
Yu, C. et al. Influence of leaching pretreatment on fuel properties of biomass. Fuel Process. Technol. 128, 43-53 (2014).
Stefanidis, S. D. et al. Biomass and Bioenergy Optimization of bio-oil yields by demineralization of low quality biomass. Biomass and Bioenergy 83, 105-115 (2015).
Garverick, L., Corrosion in the petrochemical industry, British Corrosion Journal 30, (1995).

The invention claimed is:

1. An integrated process for the conversion of a biomass with an impurity content, the process comprising pretreating the biomass to convert the biomass into a quality feedstock with a desired moisture content; and transporting the pretreated and converted biomass for the production of biochemicals and biofuels;
   wherein said pretreating is a leaching process comprising the following phases:
   a1. feeding at least one biomass or mixture of biomasses to a tank with a stirring system;
   a2. recovering an untreated effluent from an existing and adjacent factory, plant or mill, and wherein the untreated effluent is defined from the group consisting of effluents from a cellulose production mill, effluents from the sugarcane or energy cane processing plant, or effluents from the cellulose sugar production plant
   b. adding the untreated effluent of phase (a2) as a solvent to the biomass of phase (a1) to form a solid/solvent mixture;
   c. adjusting the consistency of the solid/solvent mixture;
   d. stirring the solid/solvent mixture;
   e. discharging material obtained in phase (d) for separation of liquid and solid phases;
   f. sending the liquid phase to a biomass fines recovery system;
   g. feeding the solid material to a secondary dewatering system to obtain a high quality pretreated biomass;
   wherein the biomass of step (b) is a plant biomass defined from the group consisting of: wood, including bark and chips, leaves and roots; shrub and herbaceous biomass, including grasses and weeds; sugarcane, including bagasse resulting from the processing in the industry and straw from the harvest; energy cane as a whole, or just stems; straw and agricultural residues from the processing of maize, including the cob and leaves; cereal straw such as rice, wheat, rye, inter alia, and sawdust, cardboard and urban organic waste; or a mixture thereof,
   wherein the leaching time is between 1 and 5 minutes,
   wherein the moisture range of the pretreated biomass is between 56% and 80%,
   wherein the pretreated biomass has a potassium content between 209 and 1200 ppm, and
   wherein the pretreated biomass has a sodium content between 200 and 650 ppm.

2. Process, in accordance with claim 1, wherein the wood is selected from a group consisting of *araucaria*; long fiber cedar wood; cypress; Rocky Mountain Douglas fir; European yew; hemlock; kauri; kaya; larch; pine tree; redwood; rimu; fir; sugi; acacia; azalea; *albizia* (lebbek tree); alder; apple tree; arbutus; ash wood; aspen; Australian red cedar; ayan; balsa tree; linden; beech; birch; sweet-chestnut; ebony; bocote; maple; boxwood; Brazilwood; bubinga; horse-chestnut; white walnut; *catalpa; cherry tree; carap; red chestnut; Ceratopelatum apetalum* (coachwood); cocobolo; willow tree; Canadian poplar; *magnolia*; Cornelian cherry; ebony; elm; *eucalyptus*; cogwood; *passiflora*; Tupelo; pecan; hardwood tree; juca; ipe tree; iroko; *casuarina; jacaranda; courbaril; sycamore; laurel; terminalia; Lignum vitae*; carob tree; mahogany; maple; meranti; mpingo; oak; obeche; okoumé; Oregon myrtle; California bay laurel tree; pear tree; poplar; ramin; red-cedar; Brazilian rosewood tree; shala tree; sandal wood; *sassafras*; Indian satinwood; silky oak; silver wattle; snakeroot; azedeira; Spanish cedar; American sycamore; teak, walnut; willow tree; tulip tree; bamboo; palm tree; and combinations/hybrids thereof.

3. Process, in accordance with claim 2, wherein the wood is *eucalyptus*.

4. Process, in accordance with claim 1, wherein the biomass is energy cane.

5. Process, in accordance with claim 1, wherein the biomass consists of wood chips, wood bark, or a combination thereof.

6. Process, in accordance with claim 5, wherein the biomass consists of wood bark in a quantity between 5% and 100%.

7. Process, in accordance with claim 6, wherein the biomass consists of wood bark in a quantity between 30% and 100%.

8. Process, in accordance with claim 1, wherein the adjustment of the consistency of the mixture in phase (c) is carried out by adding solvent until said consistency is between 1 and 30% of solid content on a mass basis.

9. Process, in accordance with claim 8, wherein the solvent is added until the consistency is between 2% and 15% of solid content on a mass basis, or between 5% and 15% of solid content on a mass basis.

10. Process, in accordance with claim 1, wherein phase (d) occurs in a medium having a temperature between 25° C. and 100° C.

11. Process, in accordance with claim 1, wherein phase (d) occurs in a medium having a pH between 2.0 and 11.0.

12. Process, in accordance with claim 1, wherein the stirring in phase (d) varies between 5 and 1000 rpm.

13. Process, in accordance with claim 1, wherein the moisture range of the pretreated biomass is between 56% and 70%.

14. Process, in accordance with claim 1, wherein the pretreated biomass has a chlorine content up to 100 ppm.

15. Process, in accordance with claim 1, wherein the ash content of the biomass is reduced.

* * * * *

UNITED STATES PATENT AND TRADEMARK OFFICE
CERTIFICATE OF CORRECTION

| | |
|---|---|
| PATENT NO. | : 11,827,860 B2 |
| APPLICATION NO. | : 16/304458 |
| DATED | : November 28, 2023 |
| INVENTOR(S) | : Danilo Ribeiro De Lima et al. |

Page 1 of 1

It is certified that error appears in the above-identified patent and that said Letters Patent is hereby corrected as shown below:

On the Title Page

Item (73) Assignee, Please change "Suzano S.A., São Paulo (BR)" to -- Suzano S.A., São Paulo (BR); Ensyn Renewables, Inc., Wilmington, DE (US) --

In the Claims

In Column 17, Line 52, Claim 1, delete "production plant" and insert -- production plant; --, therefor.

In Column 18, Line 24, Claim 2, delete "*Ceratopelatum apetalum*" and insert -- *Ceratopetalum apetalum* --, therefor.

Signed and Sealed this
Fourth Day of June, 2024

Katherine Kelly Vidal
*Director of the United States Patent and Trademark Office*